United States Patent Office 3,201,432
Patented Aug. 17, 1965

3,201,432
TIN DERIVATIVES OF SULFOSALICYLIC ACIDS
John R. Leebrick, Roselle Park, N.J., assignor, by mesne assignments, to M. & T. Chemicals Inc., New York, N.Y., a corporation of Delaware
No Drawing. Filed Dec. 15, 1961, Ser. No. 159,738
16 Claims. (Cl. 260—429.7)

This invention relates to tin-containing derivatives of sulfosalicylic acid and to methods of preparing the same.

It is an object of this application to set forth novel compositions of matter particularly characterized by their unexpectedly high melting point and by their activity against microorganisms. It is a fruther object to set forth a technique of preparing these novel compositions. Other objects will be apparent to those skilled in the art on inspection of the following description.

In accordance with certain of its aspects, the novel process of this invention comprises the steps of mixing together sulfosalicylic acid having the formula

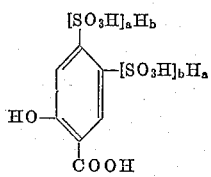

with

moles of $(R_3Sn)_2O$ for each mole of said acid, and heating said mixture thereby completing reaction to form

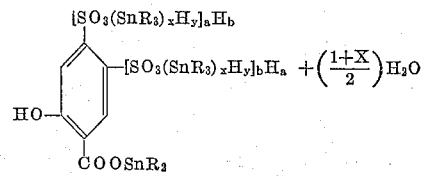

wherein $a$, $b$, $x$, and $y$ are each independently selected from the group consisting of 0 and 1; wherein $a+b=1$; and $x+y=1$.

Sulfosalicylic acid may be commercially available as 3-carboxy-4-hydroxybenzenesulfonic acid or as the isomer 3-hydroxy-4-carboxybenzenesulfonic acid, or as a mixture thereof. Both forms of the acid, which may commonly be prepared by the sulfonation of salicylic acid and which may as commercially available exist in the form of the dihydrate, may be represented by the formula

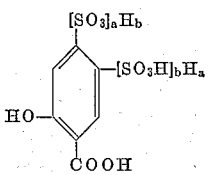

wherein $a$ and $b$ are each selected from the group consisting of 0 and 1 and $a+b=1$. When $a$ is 1 and $b$ is 0, the formula becomes I and when $a$ is 0 and $b$ is 1, the formula becomes II.

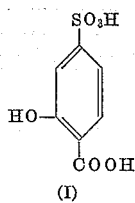

(I)

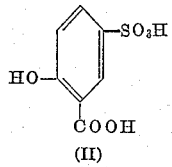

(II)

The compounds $(R_3Sn)_2O$ which may be employed to form the novel products of this invention may include those wherein R may be a hydrocarbon radical which may be inertly substituted. An inertly substituted hydrocarbon radical is one which contains no active groups which may react with the other components of the reaction system. Typically R may be selected from the group consisting of alkyl, aryl, alkenyl, alkynyl, aralkyl, alkaryl, cycloalkyl, cycloalkenyl, cycloalkynl, etc.

Typical alkyls may include methyl, ethyl, propyls, butyls, amyls, hexyls, heptyls, octyls, etc. Typical aryls may include phenyl, naphthyl, etc. Typical alkenyls may include vinyl, allyl, 1-butenyl, etc. Typical alkynyls may include ethynyl, propynyls, butynyls, etc. Typical aralkyls may include benzyl, styryl, w-phenyl propyl, etc. Typical alkaryls may include tolyl, xylyl, etc. Typical cycloalkyls may include cyclohexyl, cycloheptyl, methylcyclohexyls, etc. Typical cycloalkenyls may include cyclohexenyl, cycloheptenyl, cyclohexadienyl, etc. It will be found that the nature of R will have little or no effect on the process for preparing the compositions of this invention.

In one preferred embodiment, R may be a hydrocarbon radical selected from the group consisting of lower alkyl radicals and the phenyl radical.

It will be apparent to those skilled in the art that certain of the compounds $(R_3Sn)_2O$ may exist in equilibrium, in the presence of small amounts of water, with the corresponding hydroxide viz.:

$$(R_3Sn)_2O + H_2O \rightarrow 2R_3SnOH$$

Furthermore, it will also be apparent that certain of the compounds $(R_3Sn)_2O$ may be prepared and commonly available (because of the above equilibrium) as the hydroxide, $R_3SnOH$. For example, the methyl, ethyl, and phenyl derivatives are commonly available as the hydroxide, e.g. triphenyltin hydroxide, rather than as the oxide. Thus, the formula $(R_3Sn)_2O$ may be taken to include the equivalent hydroxide $R_3SnOH$. Since the former compound contains two $R_3Sn$— groups per molecule and the latter contains one, it will be necessary, when the hydroxide is used in place of the oxide that the molar quantity of the tin compound be doubled so that the same molar ratio of $R_3Sn$— groups to sulfosalicylic acid will be mainatined.

Illustrative compounds $(R_3Sn)_2O$ may include bis(tri-n-butyltin) oxide, bis(tri-n-amyltin) oxide, bis(tri-n-hexyltin) oxide, bis(tri-n-propyltin) oxide, bis(tri-n-octyltin) oxide, trimethyltin hydroxide, triethyltin hydroxde, triphenyltin hydroxide, etc.

Preparation of the novel reaction products of this invention may be effected by reacting sulfosalicylic acid with the compound $(R_3Sn)_2O$. Reaction of these compounds may be effected by mixing the reactants and heating the mixture preferably to at least about 100° C. and preferably to 120°–180° C. at which temperature the water formed as by-product may be volatilized. The reaction mixture may be maintained at this temperature for at least about 30 minutes, and preferably 60–90 minutes. Reaction may be conducted under vacuum if desired.

During the course of the reaction in its preferred embodiment, as the evolved water is volatilized, the mixture may become progressively more viscous until at the end of 60–90 minutes, the mass may approach the solid state.

If desired, the reaction may be conducted at lower temperature and under more readily controlled conditions by use of a diluent, preferably one boiling above 100° C.–110° C. Preferably the diluent may (a) be a liquid which forms an azeotropic mixture with water, thereby driving the reaction to completion, (b) be solvent for the product, and (c) have a boiling point of about 110° C.–200° C. Typical of the diluents which may be employed may be toluene, xylenes, decalin, cymenes, cumene, ethylbenzene, t-butyl benzene, n-butyl ether, amyl alcohols, etc. Other appropriate solvents including aliphatic or aromatic hydrocarbons, alcohols, ethers, etc. may be employed. When a diluent-solvent is employed, e.g. benzene, the temperature of the reaction mixture may be e.g. 70° C. which may correspond to the boiling point of the benzene-water azeotrope. In the practice of this invention, lower temperatures may be employed but the reaction time will be greatly increased thereby.

When the reaction is conducted in the presence of diluent, it may be conducted under reflux until the theoretical amount of water is recovered. The diluent may then be removed by distillation, preferably at reduced pressure of typically 20–50 mm. Hg.

The desired reaction product may be formed in the reaction vessel as the by-product water is removed therefrom. As so prepared it may approach 100° purity. It may be in the form of a liquid which on cooling may become a thick viscous liquid or pasty mass or a hard rock-like solid.

When the ratio of reactants is one mole of sulfosalicylic acid for 0.5 mole of $(R_3Sn)_2O$, the reaction may be as follows:

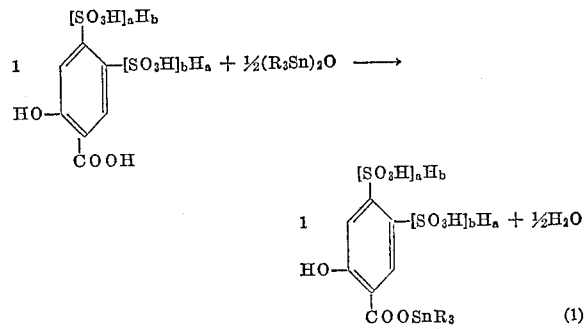

This product may be isolated or if desired it may be further reacted with an additional 0.5 mole of $(R_3Sn)_2O$ as follows:

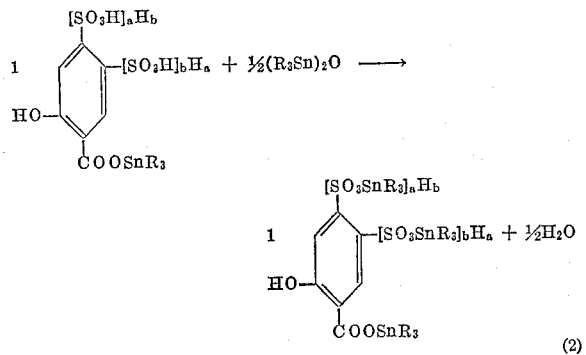

If desired, the sulfosalicylic acid may be reacted with an equimolar amount of $(R_3Sn)_2O$ to yield the last noted product.

The novel compositions of matter of this invention formed by the reaction of sulfosalicylic acid with a compound having the formula $(R_3Sn)_2O$ may have the formula

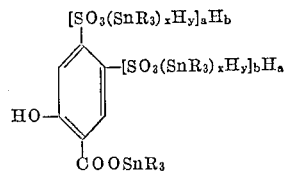

wherein R is a hydrocarbon radical; $a$, $b$, $x$, and $y$ are numbers each independently selected from the group consisting of 0 and 1; $a+b=1$; and $x+y=1$.

It is a feature of this invention that the novel compounds, especially those containing R groups having less than about seven carbon atoms, are particularly characterized by their unexpectedly high melting point. Typical of these preferred compounds may be noted those wherein R may be methyl, ethyl, n-propyl, i-propyl, n-butyl, i-butyl, t-butyl, n-amyl, i-amyl, n-hexyl, i-hexyl, etc. In the preferred embodiment, R may be the n-butyl radical. Another preferred compound may be that wherein R is the n-propyl radical.

The novel products of this invention, and particularly the preferred products wherein R contains less than about seven carbon atoms, may be characterized by their unexpectedly high melting point. The reaction product of either one mole or two moles of bis(tri-n-butyltin) oxide and two moles of sulfosalicylic acid for example melts above 260° C.; the corresponding phenyl compound melts at about the same temperature. These compounds are stable to temperatures which may approach 300° C. or more.

Preparation of the novel products of this invention may be observed by inspection of the following examples wherein the parts are by weight unless otherwise indicated.

EXAMPLE 1

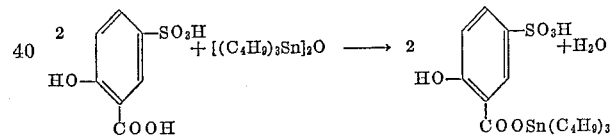

500 parts (2 moles) of sulfosalicylic acid dihydrate may be charged to a reactor fitted with stirrer, condenser, and thermometer. 2500 parts of toluene may then be added and the mixture stirred for 10 minutes during which time the acid may not go completely into solution. The mixture may be heated to 80° C. and 596 parts (1 mole) of bis(tri-n-butyltin) oxide added dropwise over thirty minutes. As the mixture is heated under reflux, water may be distilled out starting at about 93° C. The theoretical water, 90 parts (18 parts from the reaction proper and 72 parts from the acid dihydrate), may be recovered as the toluene is distilled off.

The product on cooling to room temperature may be found to be a white rock-like solid. It may be slurried with petroleum ether, filtered, washed with petroleum ether, and air dried. Melting point may be above 260° C.

The product upon cooling to room temperature may be found to have the following analysis.

| | Percent |
|---|---|
| Sn: | |
| Calculated | 23.3 |
| Found | 22.94 |
| S: | |
| Calculated | 6.3 |
| Found | 6.77 |

EXAMPLE 2

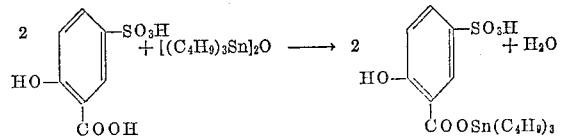

179 parts (0.3 mole) of bis(tri-n-butyltin) oxide may be charged to an open reaction vessel. The oxide may then be heated to 60° C. at which temperature 153 parts (0.6 mole) of sulfosalicylic acid dihydrate may be added with agitation. On heating with agitation, the mixture may begin to foam at about 95° C. As heating is effected over 30 minutes, the mass became completely liquid at 100° C. and as water was boiled off, the mass became pasty as the temperature aproached 115° C. after 60 minutes. The mass, which solidified on cooling to room temperature, was pulverized, slurried in petroleum ether, filtered, washed with water, filtered, washed with petroleum ether, and dried. The dried solid product, obtained in amount of 294 parts, having a melting point above 260° C., on analysis may be found to have substantially the same analysis as the product of Example 1.

EXAMPLE 3

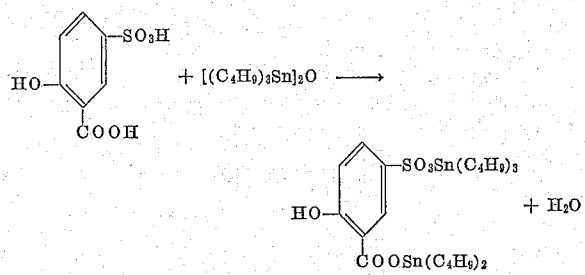

500 parts (2 moles) of sulfosalicylic acid dihydrate may be charged to a reactor fitted with stirrer, condenser, and thermometer. 3000 parts of toluene may then be added and the mixture stirred for 10 minutes during which time the acid may not go completely into solution. The mixture may be heated to 80° C. and 1192 parts (2 moles) of bis (tri-n-butyltin) oxide added dropwise over thirty minutes. The mixture was heated under reflux. Water was distilled out starting at 93° C. The theoretical water 108 parts (36 parts from the reaction proper and 72 parts from the acid dihydrate) may be recovered as the toluene is distilled off.

The product on cooling to room temperature may be found to be a white rock-like solid. It may be washed with petroleum ether, filtered, and air dried. Melting point may be above 260° C.

EXAMPLE 4

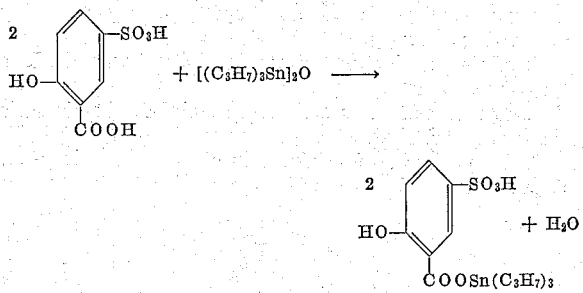

500 parts (2 moles) of sulfosalicylic acid dihydrate may be charged to a reactor fitted with stirrer, condenser, and thermometer. 1500 parts of toluene may then be added and the mixture stirred for 10 minutes during which time the acid may not go completely into solution. The mixture may be heated to 80° C. and 512 parts (1 mole) of bis(tri-n-propyltin) oxide added dropwise over thirty minutes. The mixture was heated under reflux. Water was distilled out starting at 93° C. The theoretical water, 90 parts (18 parts from the reaction proper and 72 parts from the acid dihydrate), may be recovered as the toluene is distilled off.

The product on cooling to room temperature may be found to be a white rock-like solid. It may be washed with petroleum ether, filtered, and air dried. Melting point may be above 260° C.

EXAMPLE 5

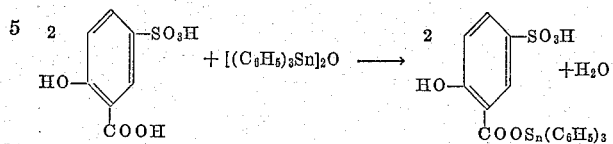

500 parts (2 moles) of sulfosalicylic acid dihydrate may be charged to a reactor fitted with stirrer, condenser, and thermometer. 2000 parts of toluene may then be added and the mixture stirred for 10 minutes during which time the acid may not go completely into solution. The mixture may be heated to 80° C. and 716 parts (1 mole) of bis(tri-n-phenyltin) oxide added dropwise over thirty minutes. The mixture was heated under reflux. Water was distilled out starting at 93° C. The theoretical water, 90 parts (18 parts from the reaction proper and 72 parts from the acid dihydrate), may be recovered as the toluene is distilled off.

The product on cooling to room temperature may be found to be a white rock-like solid. It may be washed with petroleum ether, filtered, and air dried. Melting point may be above 275° C.

EXAMPLE 6

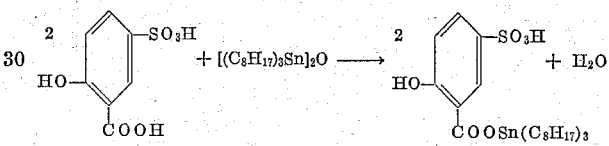

500 parts (2 moles) of sulfosalicylic acid dihydrate may be charged to a reactor fitted with stirrer, condenser, and thermometer. 2000 parts of toluene may then be added and the mixture stirred for 10 minutes during which time the acid may not go completely into solution. The mixture may be heated to 80° C. and 932 parts (1 mole) of bis(tri-n-octyltin) oxide added dropwise over thirty minutes. The mixture was heated under reflux. Water was distilled out starting at 93° C. The theoretical water, 90 parts (18 parts from the reaction proper and 72 parts from the acid dihydrate), may be recovered as the toluene is distilled off.

The product on cooling to room temperature may be found to be a white pasty mass. It may be washed with petroleum ether, filtered, and air dried.

EXAMPLE 7

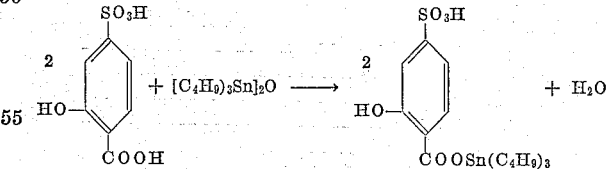

500 parts (2 moles) of sulfosalicylic acid dihydrate may be charged to a reactor fitted with stirrer, condenser, and thermometer. 2500 parts of toluene may then be added and the mixture stirred for 10 minutes during which time the acid may not go completely into solution. The mixture may be heated to 80° C. and 596 parts (1 mole) of bis(tri-n-butyltin) oxide added dropwise over thirty minutes. As the mixture is heated under reflux, water may be distilled out starting at about 93° C. The theoretical water, 90 parts (18 parts from the reaction proper and 72 parts from the acid dihydrate), may be recovered as the toluene is distilled off.

The product on cooling to room temperature may be found to be a white rock-like solid. It may be slurried with petroleum ether, filtered, washed with petroleum ether, and air dried. Melting point may be above 260° C.

It is a feature of the novel products of this invention that they are particularly characterized by their high melting point especially when the R group contains less than about seven carbons. Because of this fact, together with their extreme stability when subjected to high temperature for extended periods of time, they may find use in high temperature and/or high pressure fluids.

It is also a feature of these novel compounds that they are characterized by their unexpected microbiological activity. It may be possible to use these novel compounds substantially to obtain sanitary material which is substantially completely odor free. Because of the high melting and boiling point of these compounds, and their extremely low volatility, they may be retained on e.g. cloth or other textile for an extended period of time. They are characterized by their extremely low vapor toxicity because of low vapor pressure at ambient temperature. Such compounds, typically that formed by the process of Example 1 supra may be dissolved in volatile solvents such as methanol to form solution which may be e.g. sprayed onto textiles or other surfaces which are to be rendered resistant to attack by miccroorganisms for extended periods of time.

To illustrate the microbiological action of these materials the following experiments were carried out:

The products of Examples 1 (dissolved in ethanol), 3 (dissolved in ethanol) and 4 (dissolved in methanol) were tested to determine their anti-microbial activity by adding the solutions to each of a series of standard nutrient broths. In each series the broths after addition of the compound contained 0.25, 0.5, 1, 2, 4, 8, 16, 32, and 64 parts per million of the compound. The alcohol content of each broth was below the inhibitory amount. In each series, the ample containing the minimum amount in parts per million (p.p.m.) which was effective in controlling the growth of the organism was noted and is tabulated below as the "effective level," together with the organisms against which it was tested.

Table I

TRIBUTYLTIN SULFOSALICYATE (EXAMPLE 1)

| Organism: | Effective level, p.p.m. |
|---|---|
| Penicillium funiculosum | 16 |
| Aspergillus flavus | 1 |
| Candida albicans | 0.5 |
| Bacillus mycoides | 0.5 |

Table II

BIS(TRI-n-BUTYLTIN) SULFOSALICYATE (EXAMPLE 3)

| Organism: | Effective level, p.p.m. |
|---|---|
| Penicillium funiculosum | 8 |
| Aspergillus flavus | 0.5 |
| Candida albicans | 0.25 |
| Staph. aureus | 1 |

Table III

TRIPROPYLTIN SULFOSALICYLATE (EXAMPLE 4)

| Organism: | Effective level, p.p.m. |
|---|---|
| Penicillium funiculosum | 2 |
| Aspergillus flavus | 0.25 |
| Candida albicans | 0.25 |
| Aerobacter aerogenes | 31 |
| Pseudomonas aeruginosa | 31 |
| Staph. aureus | 4 |

From inspection of these tables, it will be apparent that these novel compositions are highly active against various types of organisms and that this activity is obtained by use of compounds which do not possess high volatility. Because of low volatility, the compounds may retain their activity in situ for extended periods of time. Furthermore these compounds, because of their low lipid solubility, are of considerably lower toxicity than prior art compounds or than the intermediate oxides from which they may be prepared. As a result of the lower volatility, the vapor is low.

Although this invention has been described with reference to specific examples, it will be apparent that various modifications may be made thereto which fall within the scope of this invention.

I claim:

1. A composition of the formula

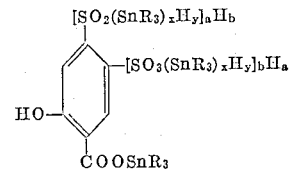

wherein $a$, $b$, $x$, and $y$ are each selected from the group consisting of 0 and 1; $a+b=1$; $x+y=1$; and wherein R is a hydrocarbon radical.

2. A composition as claimed in claim 1 wherein $b=1$.

3. A composition as claimed in claim 1 wherein $a=1$.

4. A composition of the formula

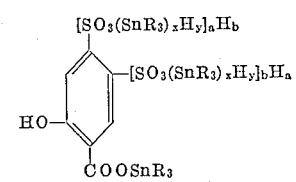

wherein R is a hydrocarbon radical selected from the group consisting of lower alkyl radicals and phenyl radicals; $a$, $b$, $x$, and $y$, are selected from the group consisting of 0 and 1; $a+b=1$; and $x+y=1$.

5. A composition of the formula

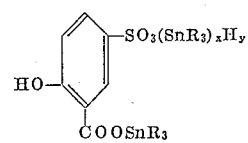

wherein R is a hydrocarbon radical selected from the group consisting of lower alkyl radicals and the phenyl radical; $x$ and $y$ are selected from the group consisting of 0 and 1; and $x+y=1$.

6. A composition as claimed in claim 5 wherein R is the n-butyl radical.

7. A composition as claimed in claim 5 wherein R is the n-propyl radical.

8. A composition as claimed in claim 5 wherein $y=1$.

9. A composition of the formula

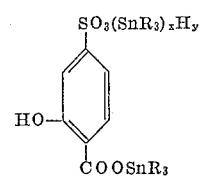

wherein R is a hydrocarbon radical selected from the group consisting of lower alkyl radicals and the phenyl radical; $x$ and $y$ are selected from the group consisting of 0 and 1; and $x+y=1$.

10. A composition as claimed in claim 9 wherein R is the n-butyl radical.

11. A composition as claimed in claim 9 wherein R is the n-propyl radical.

12. A composition as claimed in claim 10 wherein $y=1$.

13. The process for preparing

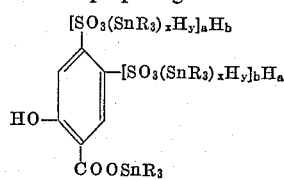

which comprises mixing one mole of

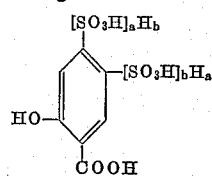

with $$\frac{1+x}{2}$$

moles of $(R_3Sn)_2O$, wherein R is a hydrocarbon radical; wherein $a$, $b$, $x$, and $y$ are each independently selected from the group consisting of 0 and 1; $a+b=1$; and $x+y=1$; and heating said mixture.

14. The process for preparing compositions as claimed in claim 13 wherein R is a hydrocarbon residue selected from the group consisting of lower alkyl radicals and the phenyl radical.

15. The process for preparing compositions as claimed in claim 13 wherein the reaction is carried out in a diluent.

16. The process for reacting 3-carboxy-4-hydroxybenzenesulfonic acid with $(R_3Sn)_2O$ wherein R is a hydrocarbon radical which comprises mixing 3-carboxy-4-hydroxybenzenesulfonic acid with $(R_3Sn)_2O$, and heating said mixture.

References Cited by the Examiner

UNITED STATES PATENTS

| | | | |
|---|---|---|---|
| 2,864,737 | 12/58 | Fields et al. | 167—22 |
| 2,873,288 | 2/59 | Rosenberg et al. | 260—429.7 |
| 2,878,155 | 3/59 | Cruickshank | 167—22 |
| 2,892,856 | 6/59 | Ramsden et al. | 260—429.7 |
| 2,957,785 | 10/60 | Leatherland | 260—429.7 |
| 2,977,379 | 3/61 | Dorfelt | 260—429.7 |

TOBIAS E. LEVOW, *Primary Examiner.*